July 3, 1928.  C. A. BORNMANN  1,675,529
CATCH FOR CAMERA FRONTS
Filed Aug. 1, 1927

INVENTOR.
CARL A. BORNMANN
BY
ATTORNEY

Patented July 3, 1928.

1,675,529

UNITED STATES PATENT OFFICE.

CARL A. BORNMANN, OF BINGHAMTON, NEW YORK, ASSIGNOR, BY MESNE ASSIGNMENTS, TO AGFA ANSCO CORPORATION, OF BINGHAMTON, NEW YORK, A CORPORATION OF NEW YORK.

CATCH FOR CAMERA FRONTS.

Application filed August 1, 1927. Serial No. 209,916.

My invention relates to photographic cameras and particularly those of the folding type, provided with a platform upon which the camera front slides and is supported when an exposure is being made.

The primary object of my invention is to provide a catch device which operates automatically to prevent the returning of the camera front into the body of the camera before the sliding rail or focusing device has been returned to its normal position on the platform.

Another object is to provide such a catch which is simple in operation, inexpensive to make, and which occupies a minimum amount of space on the camera platform.

A further object is to provide a sliding rail or focusing member with a cover plate therefor, which combines to provide both the improved catch above referred to, and tension means for maintaining the supporting leg of the platform in its adjusted position.

Other objects and advantages in details of construction and operation will be apparent as the description proceeds, reference being had to the accompanying drawing wherein like reference numerals indicate like parts.

In the drawings:—

Figure 1:
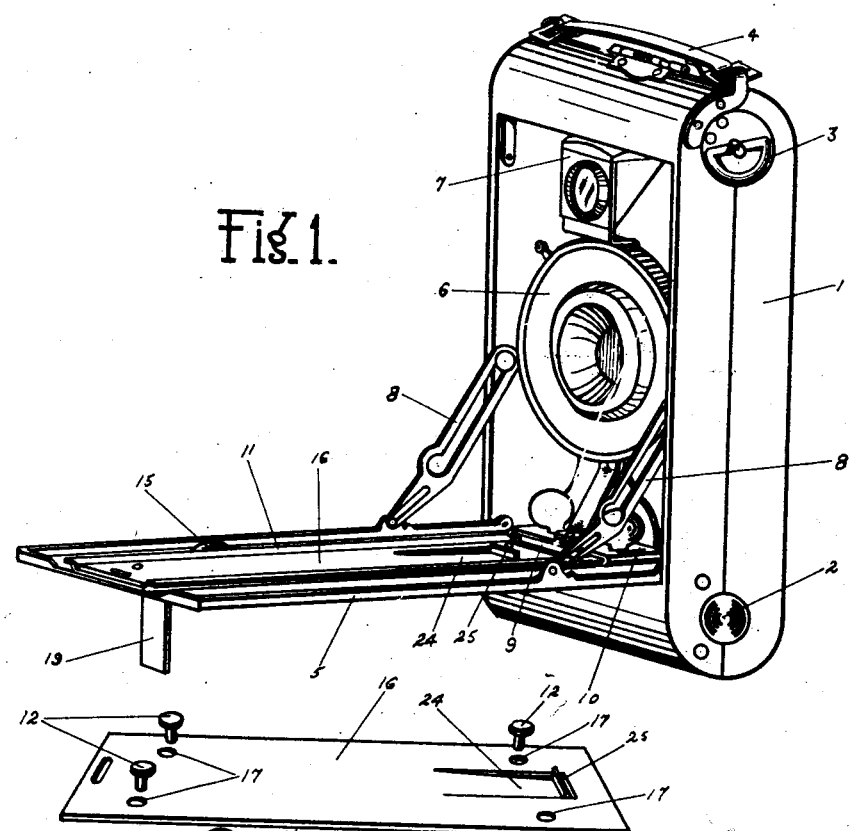
Figure 1 is a perspective view of the folding camera with the platform in its lowered position and with my improved catch thereon.
Figure 2:
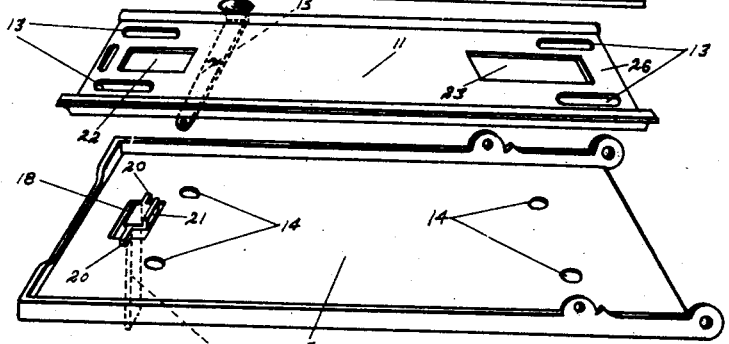
Figure 2 is an exploded view showing in perspective detail a camera platform, the sliding rail or focusing device, and the cover plate therefor, and illustrating clearly my improved catch and the tension device for the supporting leg.

Reference numeral 1 refers generally to the body of a conventional folding camera provided with the usual spool pin 2, winding key 3, carrying handle 4, hinged platform 5, shutter 6, and a view finder 7. The usual supporting brackets or braces for the platform 5 also shown at 8.

Within the body of the camera, there is provided the usual stationary rail member 9, upon which the sliding front 10 of the camera, carrying the shutter 6, is normally slidably mounted. Also slidably mounted upon the platform 5, and in alignment with the rail member 9, is the rail member 11. Rail 11 is guided upon the platform 5 by means of the pins 12, passing through the aligned slot 13 in the rail member, and secured within suitable openings 14 in the platform 5. Any desirable and conventional form of focus adjusting device 15 may be provided on the platform 5 with suitable connections to the rail 11 whereby the latter may be moved backward and forward on the platform 5.

A cover plate 16 is provided to fit over the rail member 11 between the flanges thereof and is fixedly secured to the platform 5 by means of the openings 17 in the cover plate, through which the pin 12 may pass. It will be understood therefore that the slidable rail 11 is movable on the platform 1, directly beneath the cover plate 16.

The front end of the platform 5 is provided with a recess 18, through which extends downwardly a supporting leg 19, the upper end of which is provided with lateral pintles or pivot members 20, having bearing upon the platform. This end of the supporting leg 19 is bent parallel with the platform, and then upwardly as at 21. This upwardly turned portion 21 extends through the recess 22, adjacent the front end of the rail member 11, and has engagement with the under surface of the cover plate 16. Sufficient spring tension is provided by this cover plate 16 against the upper end of the supporting leg 19 whereby to maintain said leg in either of its adjusted positions, either that shown in Figure 1, or when folded back against the under surface of the platform 5.

The rear end of the slidable rail member 11 is provided with an elongated recess 23, into which normally projects the downwardly bent spring catch member 24, preferably struck integrally from the cover plate 16. This catch member 24 has its free end upturned at right angles as at 25. The natural spring tendency of the catch 24 is such that when the recess 23 in the rail 11 underlies the catch 24, said catch will project downwardly through the recess 23 so that the upturned end 25 lies below the plane occupied by the sliding front member 10. If however, the sliding rail 11 is pulled outwardly or to the left in Figure 1, it will be understood that the rear end 26 thereof will engage the free end of the catch 24, and force the same upwardly until the upturned portion 25 lies in the path of the slidable front 10.

The operation of my improved catch is as follows:—

Figure 3:
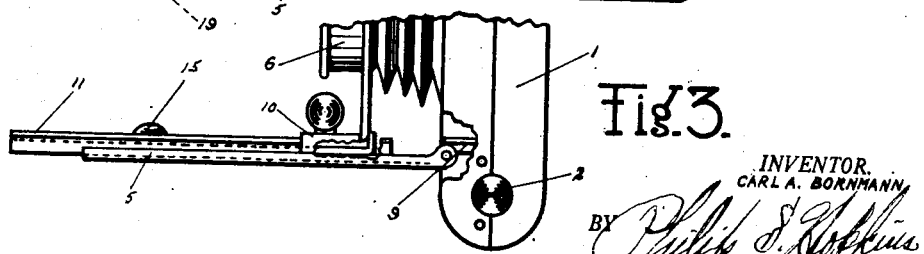
Figure 3 is a detail side view of a part of the camera shown in Figure 1, illustrating the operation of my improved sliding front catch, certain parts being broken away for clearness of illustration.

Assuming the parts to be in the position shown in Figure 1, that is, the platform open, and the sliding rail 11 in its normal position on the platform, the operator desiring to make an exposure, pulls the sliding front 10, carrying the shutter and view finder from off the fixed rail 9 onto the rail 11, bringing said sliding front to a predetermined position on the rail, usually near the front end thereof. The sliding rail 11 is now moved outwardly the required distance for proper focusing and the exposure made in the usual manner. It will be observed that as the rail 11 moves forwardly over the platform 5, the rear end of this rail and the adjacent end of the fixed rail 9 in the body of the camera, become separated. With such separation existing, if the operator should attempt to move the sliding front 10 back into the camera body without first returning the rail 11 to its normal position on the platform, it will be seen that the sliding front 10 will slip off of the rear end of the rail 11 and be displaced with relation to the fixed rail 9. It is to prevent just such an occurrence that my improved catch has been provided. Assuming again that the sliding front 10 has been pulled out near the front end of the platform on the rail 11, and the rail 11 is now slid outwardly for focusing, promptly upon such outward movement of the rail 11, the rear end 26 of the rail will engage with the catch member 24, which being resilient, will yield to the pressure of the end 26, and be forced upwardly until the upturned end 25 lies in the path of the sliding front 10. The rear end 26 of the sliding rail 11 being directly under the catch 24, and engaging therewith will thus support the catch in such position against accidental displacement. If now it should be attempted to move the sliding front 10 back towards the body of the camera as shown in Figure 3, it will be seen that such sliding front will contact with the upturned end 25 of the catch, and be prevented from sliding off of the rail 11 between the rear end thereof and the fixed rail 9. In other words, the operator must first return the rail 11 to its normal position on the platform, which by the way is the only position in which the platform may be closed on the camera, whereupon the spring catch 24 is released of its engagement with the rear end 26 of the sliding rail, and is permitted to return to its normal position through the recess 23 therein. This brings the upturned end 25 of the catch down out of the path of the sliding front, whereupon said front may now be pushed back off of the sliding rail 11 directly onto the now closely adjacent fixed rail 9.

It will be understood that many changes in details of construction and arrangement of the parts just described may be made without departing from the scope of the invention. I do not limit myself therefore to the exact form shown and described other than by the appended claims.

I claim:—

1. In combination with the platform of a camera, a slidable rail thereon, a fixed cover plate over said rail between the edges thereof, a sliding front on said rail, a spring catch on said cover plate normally out of the path of said front, and means on said slidable rail for forcing said catch upwardly in such path when the rail is extended.

2. In combination with the platform of a camera, a slidable rail thereon, a fixed cover plate over said rail between the edges thereof, pins securing said plate to said platform and guiding said rail, a sliding front on said rail, a spring catch struck from said cover plate and provided with an upturned free end, said upturned end being normally out of the path of said front, and means on said slidable rail for forcing said end upwardly in such path when the rail is extended.

3. In combination with the platform of a camera, a slidable rail thereon, a fixed cover plate over said rail between the edges thereof, a sliding front on said rail, a spring catch struck downwardly from said cover plate and provided with an upturned free end, said rail being provided with an opening normally lying beneath said catch when said rail is not extended, whereby said upturned end will be out of the path of said front, and means on said rail for forcing said catch upwardly into such path when said rail is extended.

CARL A. BORNMANN.